United States Patent
Priyanto et al.

(10) Patent No.: US 11,683,781 B2
(45) Date of Patent: Jun. 20, 2023

(54) SYSTEM AND METHOD FOR GENERATING POSITIONING REFERENCE SIGNALS

(71) Applicant: Sony Corporation, Tokyo (JP)

(72) Inventors: Basuki Priyanto, Lund (SE); Hatem Odetalla, Lund (SE); Guoda Tian, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/252,421

(22) PCT Filed: Jun. 7, 2019

(86) PCT No.: PCT/US2019/036024
§ 371 (c)(1),
(2) Date: Dec. 15, 2020

(87) PCT Pub. No.: WO2020/033034
PCT Pub. Date: Feb. 13, 2020

(65) Prior Publication Data
US 2021/0274461 A1 Sep. 2, 2021

(30) Foreign Application Priority Data

Aug. 7, 2018 (SE) .................................. 1830230-7

(51) Int. Cl.
*H04W 64/00* (2009.01)
*H04L 5/00* (2006.01)
(Continued)

(52) U.S. Cl.
CPC .......... *H04W 64/003* (2013.01); *G01S 5/0226* (2013.01); *G01S 5/10* (2013.01); *H04L 5/0048* (2013.01)

(58) Field of Classification Search
CPC ...... H04W 64/003; G01S 5/10; G01S 5/0226; H04L 5/0048
See application file for complete search history.

(56) References Cited

U.S. PATENT DOCUMENTS 9,482,742 B1 11/2016 Fischer
2011/0176499 A1 7/2011 Siomina et al.
(Continued)

FOREIGN PATENT DOCUMENTS

CN 103516657 A 1/2014
EP 2137922 A2 * 12/2009 ........... H04L 1/0071
(Continued)

OTHER PUBLICATIONS

International Search Report and Written Opinion from corresponding International Application No. PCT/US2019/036024 dated Sep. 13, 2019, 16 pages.
(Continued)

*Primary Examiner* — Muthuswamy G Manoharan
(74) *Attorney, Agent, or Firm* — Tucker Ellis LLP (57) ABSTRACT

A position reference signal (PRS) to support observed time difference of arrival (OTDOA) position determination in an electronic device is generated and transmitted by a network node that has a unique identifier. Generating the PRS includes generating a first PRS sequence and generating a second PRS sequence by modifying the first PRS sequence with a modification function to generate the second PRS sequence. A sum of the first PRS sequence and the second PRS sequence is zero.

20 Claims, 5 Drawing Sheets

(51) Int. Cl.
*G01S 5/02* (2010.01)
*G01S 5/10* (2006.01)

(56) References Cited

U.S. PATENT DOCUMENTS

| | | |
|---|---|---|
| 2013/0336133 A1 | 12/2013 | Carbonelli |
| 2014/0176366 A1 | 6/2014 | Fischer et al. |
| 2015/0198696 A1 | 7/2015 | Liu |
| 2016/0134402 A1* | 5/2016 | Park .............. H04L 27/2607 370/329 |
| 2016/0223639 A1 | 8/2016 | Davydov |
| 2017/0111880 A1 | 4/2017 | Park |
| 2018/0048444 A1* | 2/2018 | Park ................ H04L 5/0048 |

FOREIGN PATENT DOCUMENTS

| | | |
|---|---|---|
| EP | 2876951 A1 | 5/2015 |
| WO | 2010107356 A1 | 9/2010 |
| WO | 2016155//5 A1 | 10/2016 |
| WO | WO-2019023151 A1 * | 1/2019 ............ H04L 69/24 |

OTHER PUBLICATIONS

Qualcomm Incorporated, "Addition of NB-IoT TDD support", 3rd Generation Partnership Project (3GPP) Document No. R2-1809251, 3GPP TSG-RAN WG2 Meeting #102, Busan, Korea, May 21-25, 2018, 8 pages.

Office Action and Search Report from corresponding Swedish Application No. 1830230-7, dated Mar. 25, 2019, 9 pages.

Intel Corporation: "CRS awareness on CRS+PRS for OTDOA"; 3GPP TSG RAN WG1 #87 R1-1612163, dated Nov. 6, 2016; 3 pages.

InterDigital: "OTDOA design considerations"; 3GPP TSG-RAN WG1#57b R1-092586, dated Jun. 29-Jul. 3, 2009; 8 pages.

SONY: "On the usage of CRS and PRS for OTDOA"; 3GPP TSG RAN WG1#87 R1-1612993; dated Nov. 4, 2016; 2 pages.

* cited by examiner

SYSTEM AND METHOD FOR GENERATING POSITIONING REFERENCE SIGNALS

RELATED APPLICATION DATA

This application claims the benefit of Swedish Patent Application No. 1830230-7 filed Aug. 7, 2018, the disclosure of which is incorporated herein by reference in its entirety.

TECHNICAL FIELD OF THE INVENTION

The technology of the present disclosure relates generally to systems that use or support observed time difference of arrival (OTDOA) position determination and, more particularly, to a system and method for generating a positioning reference signal (PRS) to be used as the reference signal to support OTDOA position determination in a manner that facilitates cross correlation of PRS sequences from different sources.

BACKGROUND

Positioning for Internet of things (IoT) devices, such as machine type communication (MTC) devices, enhanced MTC (eMTC) and narrow-band IoT (NB-IoT) devices, has been introduced by the 3rd Generation Partnership Project (3GPP) as part of 3GPP long term evolution (LTE) release 14. The agreed positioning technique is OTDOA. Thus, an IoT device, or other type of device, may determine its position. An IoT device may be more generically referred to as a user equipment (UE), a terminal, a station, etc.

OTDOA is one type of radio access technology (RAT) dependent positioning technique that has been widely deployed in LTE networks. In principle, the UE receives reference signals from multiple base stations (e.g., eNBs) and then performs timing difference of arrival (TDOA) measurements for each base station. The difference between measured TDOA of a serving eNB and neighbor eNBs is known as reference signal time difference (RSTD) measurement. The RSTD measurement results are transmitted using LTE positioning protocol (LPP) from the UE to a location server (LS) via the base station. Based on RSTD measurement results and known fixed positions of the eNBs, the UE's position may be estimated. The LS performs positioning estimation and may return the result to the UE. OTDOA in LTE is based on transmitted PRS sequences from the base stations to the UE. Typically, the PRS sequence generated by each base station is based on a Gold sequence as set forth in 3GPP technical specification (TS) 36.211.

But the positioning accuracy performance may not be satisfactory under this technique, particularly in a transmission where limited bandwidth is used. For example, NB-IoT bandwidth is limited to 180 kHz. Relatively good performance may be achieved in a static channel (e.g., an additive white Gaussian noise (AWGN) channel) and after accumulation of many time-domain repetitions of the received PRS. Unfortunately, the use of many repetitions increases the time taken to make a position determination, increases UE power consumptions, and increases network resource utilization.

SUMMARY

The disclosed systems and methods provide for improved position determination by electronic devices, such as UEs operating in a 3GPP compliant network. The approach has application to a variety of types of devices, including those that are global positioning system (GPS) capable and those that are not GPS capable. The disclosed technique applies to the manner in which PRS sequences for supporting OTDOA are generated by a network node (e.g., a network access point or base station) and to the manner in which corresponding PRS sequences also are locally generated by the electronic device (e.g., UE) for which the position determination is being made. The modification of PRS sequence generation may be implemented so that the legacy PRS sequences also may be generated in order to support existing legacy electronic devices in a backward compatible manner. The modification to PRS sequence generation employs a low complexity function to improve position determination accuracy by reducing or minimizing the cross correlation of the PRS sequences from different network nodes. In particular, a low (e.g. zero) cross correlation is employed to improve positioning accuracy. The legacy PRS sequences are, for example, the PRS sequences that are conventionally generated in 3GPP LTE networks (4G). The modified approach may be employed in a newer network, such as 5G, or other type of network to generate PRS sequences that replace the legacy PRS sequences.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

Figure 1:
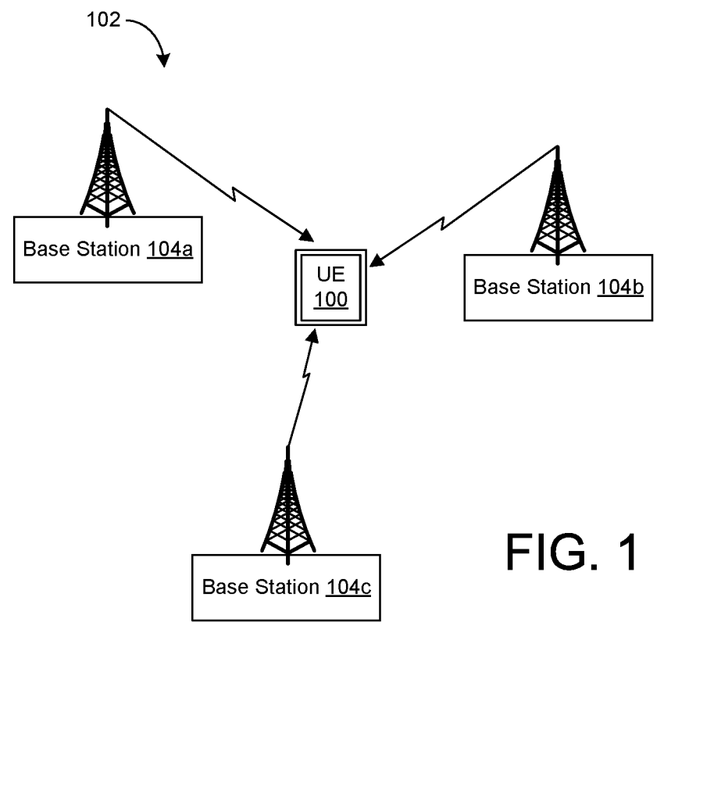
FIG. 1 is a schematic diagram of an operational network environment for an electronic device, also referred to as a user equipment (UE).

FIG. 1 is a schematic diagram of an exemplary network environment in which the disclosed techniques are implemented. It will be appreciated that the illustrated network environment is representative and other environments or systems may be used to implement the disclosed techniques.

The network environment relates to an electronic device, such a user equipment (UE) 100. As contemplated by 3GPP standards, the UE may be an internet of things (IoT) device or a mobile radiotelephone (a "smartphone"). Other exemplary types of UEs 100 include, but are not limited to, a gaming device, a media player, a tablet computing device, and a computer. IoT devices typically communicate using machine-to-machine (M2M) communications or machine-type communications (MTC).

The network environment includes a wireless communication network that is configured in accordance with one or more 3GPP standards, such as a 3G network, a 4G network or a 5G network. The wireless communication network also may be referred to as a 3GPP network. The 3GPP network includes a core network (CN) (not shown) and a radio access network (RAN) 102.

The RAN 102 includes a plurality of RAN nodes, which are also referred to as base stations 104. Three bases stations 104, respectively labeled with reference numbers 104a, 104b and 104c, are shown in the illustrated embodiment. It will be appreciated that more than three base stations 104 may be present. The base stations 104 may be, for example, an evolved node B (eNB) base station or a 5G generation gNB base station. Typically, a radio link is established between the UE 100 and one of the base stations 104, which is referred to as the servicing base station 104 for purposes of data communications. Other base stations 104 may be within communication range of the UE 100 and may support position determinations made by the UE 100 as disclosed herein.

The RAN 102 is considered to have a user plane and a control plane, the control plane is implemented with radio resource control (RRC) signaling between the UE 100 and the servicing base station 104. Other signaling between the base station 104 and the UE may include UE capability signaling.

The disclosed techniques apply to other types of networks and/or radio access technologies. Therefore, the disclosed base stations 104 may be generically referred to as radio access nodes and the disclosed UE 100 may be generically referred to as an electronic device. It is possible that equipment other than radio access nodes may generate and transmit PRS sequences to the UE 100. For example, a base station or a beacon transmitter with a fixed location or a current location known to a high degree of accuracy may transmit PRS sequences to the UE 100. Therefore, a network component that generates and transmits PRS sequences in accordance with the disclosed techniques (e.g., a base station or other device) may be referred to as a network node.

Figure 2:
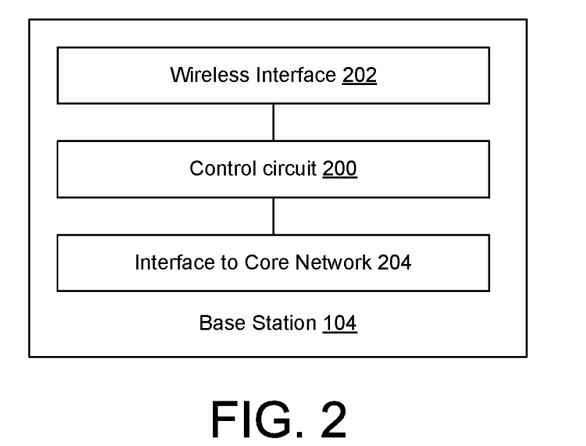
FIG. 2 is a schematic diagram of a base station (e.g., a network node) in the network environment.

With additional reference to FIG. 2, illustrated is a schematic block diagram of the base station 104. The base station 104 includes a control circuit 200 that is responsible for overall operation of the base station 104, including controlling the base station 104 to carry out the operations described herein. In an exemplary embodiment, the control circuit 200 may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 200 in order to carry out operation of the base station 104.

The base station 104 includes a wireless interface 202, such as a radio transceiver, for establishing an over the air connection with the UE 100. The base station 104 also includes an interface 204 to the core network (not shown). The base station 104 also may include an interface to one or more neighboring base stations 104 for conducting network coordination in the RAN 102.

Figure 3:
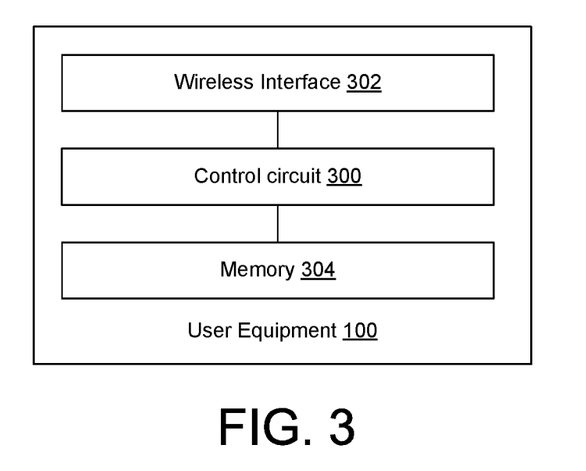
FIG. 3 is a schematic diagram of a UE in the network environment.

With additional reference to FIG. 3, illustrated is a schematic block diagram of the UE 100. The UE 100 includes a control circuit 300 that is responsible for overall operation of the UE 100, including controlling the UE 100 to carry out the operations described herein. In an exemplary embodiment, the control circuit 300 may include a processor (e.g., a central processing unit (CPU), microcontroller, or microprocessor) that executes logical instructions (e.g., lines or code, software, etc.) that are stored by a memory (e.g., a non-transitory computer readable medium) of the control circuit 300 or a separate memory 304 in order to carry out operation of the UE 100.

The UE 100 includes a wireless interface 302, such as a radio transceiver, for establishing an over the air connection with the servicing base station 104 and receiving PRS sequences from multiple base stations 104. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Position Determination

The general operation of OTDOA position determination using PRS is generally known to those of ordinary skill in the art. Therefore, a detailed explanation of this position determination technique will not be made. Rather, discussion will focus on the manner in which PRS sequences are generated.

In general, OTDOA is a multilateral positioning method in which the UE 100 measures the time of arrival (TOA) of signals received from multiple base stations 104. The time differences between the signals from the different base stations 104 and the known locations of the base stations 104 are processed to provide a position solution.

The PRS sequences should satisfy good cross correlation properties between the received PRS and the locally generated PRS at the UE side, the locally generated PRS being a reference. In the following description, Gold codes are used as a sequence generator for PRS sequences. But a similar approach may be applied to other sequences, such as Zadoff-chu and M-sequence.

For many IoT devices, low power consumption is desired to extend battery life. Relatively simple correlator receivers are often employed to achieve low power consumption. But receiver performance for positioning purposes is affected by the adequacy of auto correlation and cross correlation. For instance, auto correlation should be maximized and cross correlation between the different base stations 104 should be minimized.

The disclosed techniques focus on reducing cross correlation between the different base stations 104. This is achieved by modifying the way in which each base station 104 that transmits a PRS to the UE 100 generates the PRS and similarly modifying the way that the UE 100 generates an internal reference PRS. PRS transmissions are typically sent as a series of repetitions. According to the disclosed techniques, each PRS iteration contains two PRS sequences, referred to herein as a first PRS sequence and a second PRS sequence. First and second PRS sequences also may be referred to as first and second PRS symbols.

Using a unique identifier of the base station 104 (e.g., cell ID), the base station generates the first PRS sequence. The first PRS sequence may be generated in the manner that a conventional PRS sequence (also referred to as a PRS symbol) is generated, such as using a Gold sequence generator.

The base station 104 applies a modification function to the first PRS sequence to generate the second PRS sequence. For transmission of the first and second PRS sequences, the first and second PRS sequences are modulated, such as by using orthogonal frequency divisional multiplexing (OFDM). For example, in an LTE system, the PRS sequence is generated for a specific slot in a radio frame. The PRS sequence is mapped to QPSK modulation symbols. Furthermore, those QPSK symbols are modulated using OFDM into an OFDM symbol.

For instance, output from a PRS generator block may be feed into a QPSK modulator block. The output of the QPSK modulator block may be input to a digital signal processor, whose outputs are fed to an inverse fast Fourier transform (IFFT) block that performs the OFDM modulation. The output of the IFFT block is fed into a cyclic prefix (CP) insertion block, and then ultimately transmitted.

Figure 4:
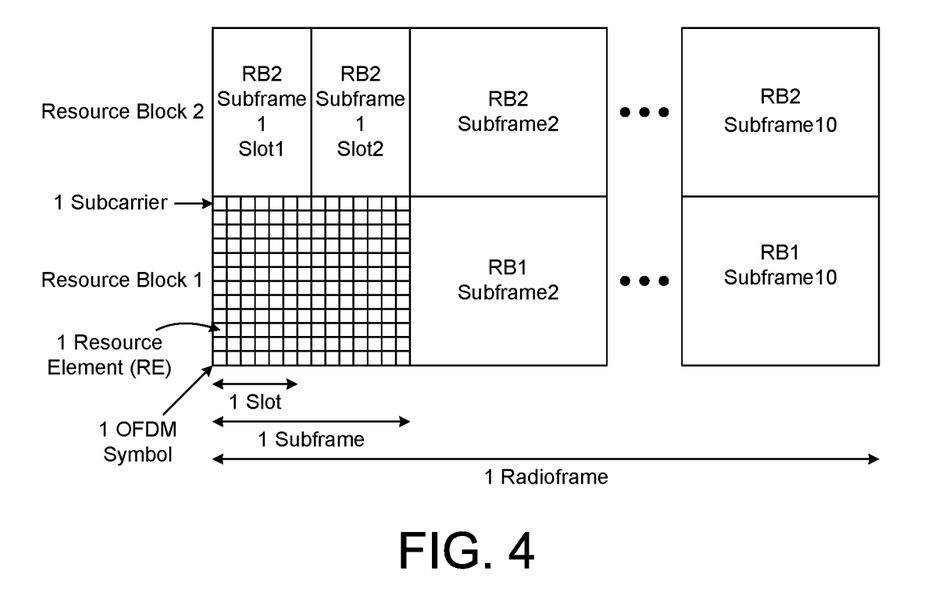
FIG. 4 is a depiction of a radioframe for two resource blocks.

The result is an OFDM symbol for the cell ID of the base station 104 containing the first and second PRS sequences. The OFDM symbol representing the PRS sequence may be transmitted in an appropriate resource element (RE). FIG. 4 illustrates a radioframe that has been broken down into subframes for each of two resource blocks (RBs). Each subframe has two slots are further divided into REs according to subcarrier and time.

Figure 5A:
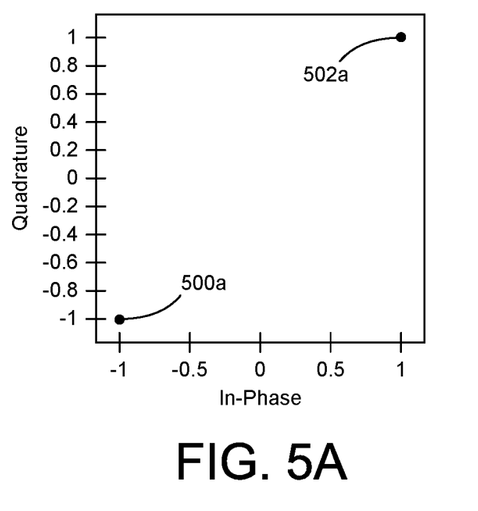
FIG. 5A is a constellation diagram for an OFDM symbol containing a first PRS signal and a second PRS signal generated by a first base station.
Figure 5B:
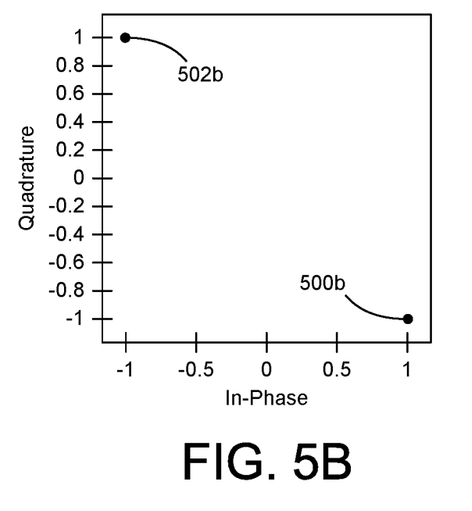
FIG. 5B is a constellation diagram for an OFDM symbol containing a first PRS signal and a second PRS signal generated by a second base station.

To further depict the disclosed approach, FIG. 5A illustrates an exemplary constellation diagram of an OFDM symbol containing a first constellation point 500a representing the first PRS sequence and a second constellation point 502a representing the second PRS sequence for the first base station 104a. FIG. 5B illustrates an exemplary constellation diagram of an OFDM symbol containing a first constellation point 500b representing the first PRS sequence and a second constellation point 502b representing the second PRS sequence for the second base station 104b. A similar constellation diagram(s) may be drawn for the third base station 104c and any other base stations 104 that provide a PRS to the UE 100.

The modulated first PRS sequence and the second PRS sequence are transmitted to the UE 100, and together form a PRS instance. The process may be repeated to send multiple PRS instances, each comprising a pair of a first PRS sequence and a second PRS sequence.

Figure 6:
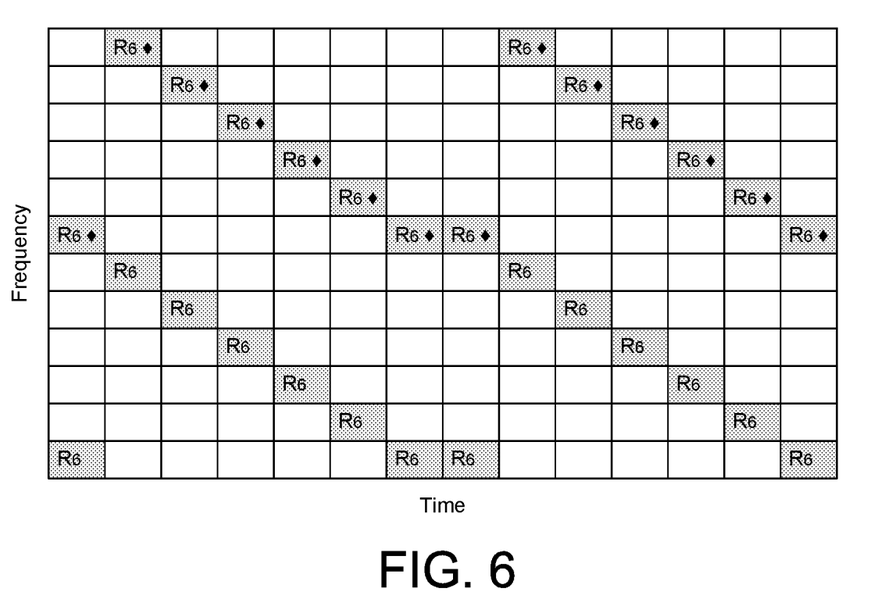
FIG. 6 is a PRS resource grid in a NB-IoT stand-alone mode showing transmission of PRS sequences that are generated in accordance with aspects of the disclosed techniques.

Generation of the PRS sequences may occur using offset resource elements (REs) within a physical resource block (PRB). For example, FIG. 6 illustrates an exemplary PRB showing PRS instances transmitted in each time slot with the first PRS sequence represented by $R_6$ and the second PRS sequence representing by $R_6$ followed by a diamond (♦) symbol, or $R_6$♦. For purposes of illustration, FIG. 5 is a PRS RE resource grid in NB-IoT stand-alone mode. In the illustrated approach, the second PRS measure sequence is offset from the first PRS sequence by six subcarriers or the adjacent REs that has been assigned to carry PRS. It will be understood that other approaches to allocating REs may be used. Also, the PRS instances from other base stations (e.g., eNBs) may be located in another REs or the same REs depending on each base station's cell ID.

The modification function is configured so that the sum of the first PRS sequence and the second PRS sequence is zero. For example, for any given OFDM symbol for a base station 104, the first constellation point 400 in the constellation diagram of a modulated symbol (e.g., QPSK) in an OFDM symbol is opposite (e.g., rotated 180 degrees from) the second constellation point 402 in the constellation diagram of a modulated symbol (e.g., QPSK) in the OFDM symbol. For multiple PRS iterations, the arrangement of the first and the second PRS sequence need not be in interleaved arrangement as set forth. Rather, the sequences may be arranged in another manner as long as the sum of relevant components is equal to zero.

For cross correlation of the received PRS sequence from one of the base stations 104, the UE 100 generates a PRS reference having a first PRS reference sequence and a second PRS reference sequence. First and second PRS reference sequences also may be referred to as first and second PRS reference symbols. The PRS reference may be considered as a PRS sequence that is locally generated by the UE 100.

The first PRS reference sequence is generated from data that is stored in memory 304 and and/or acquired by the UE 100. For example, the first PRS reference sequence may be generated from the unique identifier (e.g., cell ID) of the appropriate base station 104, an OFDM symbol number, subcarrier number and CP type. For this purpose, the UE 100 may gather information regarding the surrounding network nodes (e.g., cell-IDs). The UE 100 applies a modification function to the first PRS reference sequence to generate a second PRS reference sequence. The modification function may be the same modification function used by the base stations 104 for generation of the respective second PRS sequences. The modification function is configured so that the sum of the first and second PRS reference sequences is zero. If the first PRS reference sequence and the second PRS reference sequence were modulated into a respective OFDM symbol, the OFDM symbol would have the same characteristics in terms of constellation point locations as the OFDM symbol corresponding to the first and second PRS signals that are generated at the base station 104 as described above.

Figure 7:
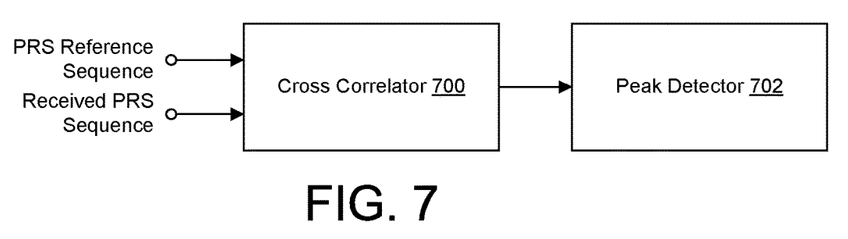
FIG. 7 is a schematic representation of a PRS receiver handling function carried out in the electronic device.
Figure 8:
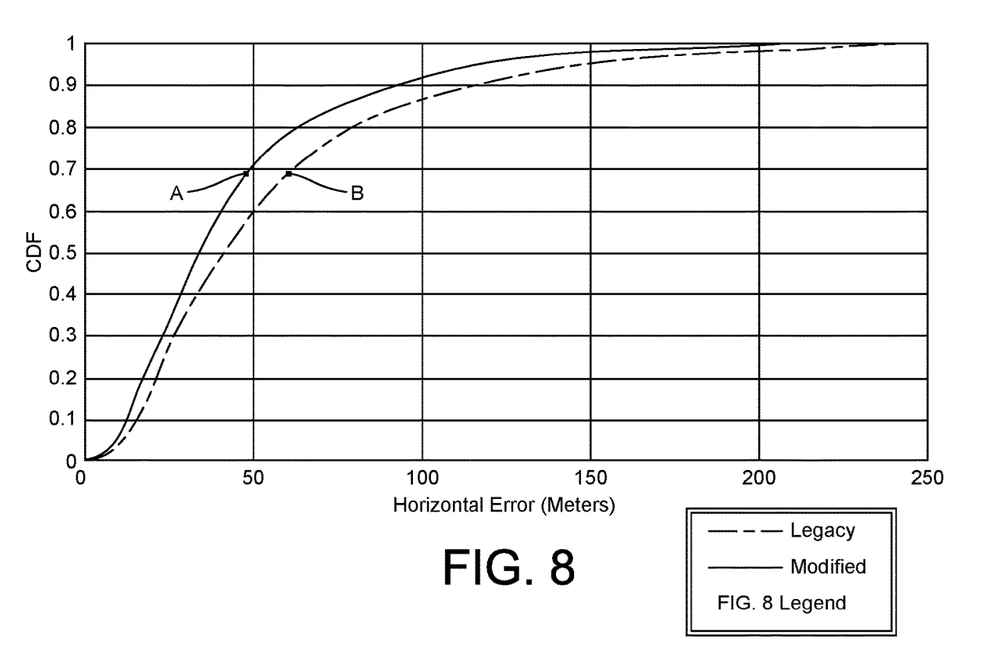
FIG. 8 is a graph illustrating performance of position determination in accordance with aspects of the disclosed techniques and position determination in accordance with conventional techniques.

Turning to FIG. 7, a schematic representation of a PRS sequence receiver handling function carried out in the UE 100 is illustrated. Each PRS iteration received from the base station 104 (the received PRS sequence in FIG. 6) is input to a cross correlator 700 and the corresponding PRS reference generated by the UE 100 is input to the cross correlator 700. The cross correlator 700 carries out a cross correlation function (e.g., at the OFDM symbol level) and an output of the cross correlation function is input to a peak detector 702 that carries out a peak detection function. The peak detector 702 finds the first peak and, hence, estimates the time of arrival (ToA).

In the UE 100, auto-correlation and cross correlation functions are defined as $R_{xx}(\tau)$ and $R_{xy}(\tau)$, respectively shown in equation 1 and equation 2.

$$R_{xx}(\tau) = \sum_{n=-\infty}^{+\infty} x(n)x^*(n+\tau) \qquad \text{Eq. 1}$$

$$R_{xy}(\tau) = \sum_{n=-\infty}^{+\infty} x(n)y^*(n+\tau) \qquad \text{Eq. 2}$$

With narrower main-lobe of auto-correlation $R_{xx}(\tau)$ and minimized cross correlation values $R_{xy}(\tau)$ (the result of cross correlation between base stations 104), positioning accuracy may be improved as both auto-correlation and cross correlation play roles in positioning evaluation, as set forth in equation 3.

$$\eta(\tau) = \frac{ACF}{CCF + N_o ACF} = \frac{R_{xx}(\tau)}{R_{xy}(\tau) + N_o R_{xx}(\tau)} \quad \text{Eq. 3}$$

In order to reduce the cross correlation, the second PRS sequence is placed in the opposite position in the constellation diagram from the first PRS sequence. An exemplary modification function to generate the second PRS sequence (or the second PRS reference sequence), in the form of a modified Gold sequence generator, is listed in the following pseudo-code listing 1. The pseudo-code of listing 1 is provided in MATLAB code.

Listing 1

```
RSSeq = zeros(1,2);
for m = 0:1
    if m ==0
        RSSeq(m+1) = ((1-2*c(2*m+1))+...
        1i*(1-2*c(*m+2)))/sqrt(2);
    else
        RSSeq(m+1) =-1*RSSeq(1);
    end
end
```

In listing 1, RSSeq stands for Reference Signal, c is the generated Gold code bits (either 0 or 1), and m is the symbol index (e.g., m equals zero (0) for the first PRS sequence and m equals one (1) for the second PRS sequence). Here, the first PRS sequence (RSSeq(1)) is generated, for example, in accordance with 3GPP TS 36.211 V15 section 6.10.4.1. The second PRS sequence is generated in accordance with the foregoing to be "the opposite" of the first PRS sequence (e.g., so their sum is zero).

A simulation was carried out to compare the disclosed technique with the legacy technique described in TS 36.211 version 15.2.0 and earlier. FIG. 7 is a graph of cumulative distribution function (CDF) version horizontal error to show performance of the two approaches, where the solid line represents the approach described herein and the dash-dot line represents the conventional (legacy) approach for an AWGN channel. As shown at points A and B (CDF 0.7), almost 13 meters in accuracy was gained. Therefore, the performance accuracy was improved by approximately 22 percent.

Various individual aspects of the disclosed approach may be summarized as follows: 1) introduce a function in PRS generation to minimize the cross correlation of the positioning reference signal from multiple base stations; 2) the function is implemented so that the subsequent PRS symbol is in the opposite constellation point; 3) to support PRS transmission with wider bandwidth, 1) and 2) may be repeated for the next PRB iteration(s); 4) the receiver of the UE 100 may be aware of this operation and employ the same approach when it generates a reference signal for correlation purposes; and 5) there may be signaling from base station 104 and/or UE 100 to coordinate support for this operation, and support backward compatibility if needed. The signaling may be in the form of, for example, radio resource control (RRC) signaling or UE capability signaling.

Figures 9, 10:
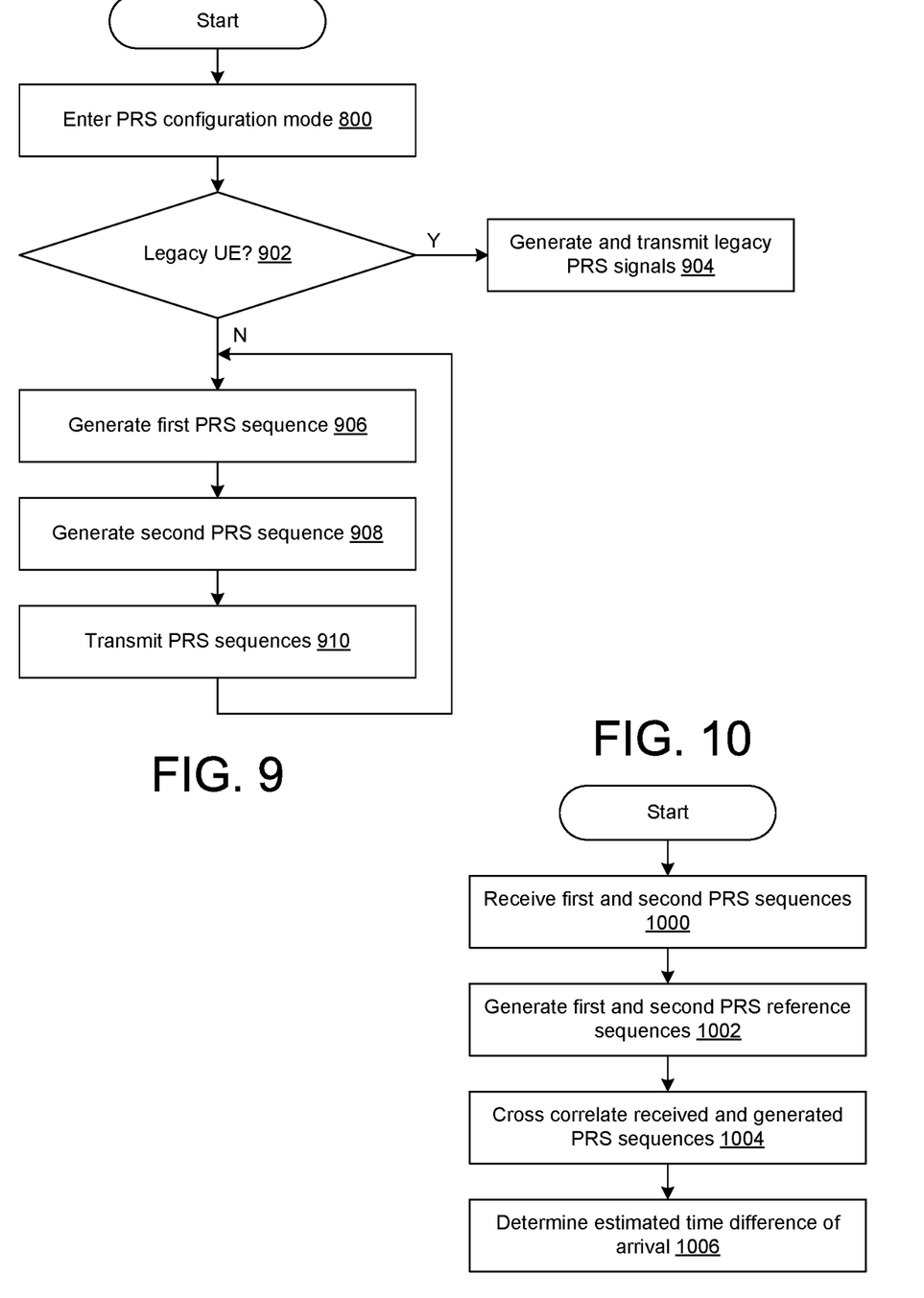
FIG. 9 is an exemplary flow diagram of PRS operations carried out by the base station.
FIG. 10 is an exemplary flow diagram of PRS operations carried out by the UE.

With additional reference to FIG. 9, shown is an exemplary flow diagram representing steps that may be carried out by the base station 104 when executing logical instructions to generate and transmit a PRS. Complimentary operations of the UE 100 also will be understood from this disclosure. Although illustrated in a logical progression, the illustrated blocks of FIG. 9 may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 900 where the base station 104 enters a PRS configuration mode. The configuration mode is used to determine which type of PRS to generate, such as a legacy PRS or a PRS according the disclose approach. For example, in block 902, the base station 104 determines if the UE 100 supports generating a first PRS reference sequence and generating a second PRS reference sequence by applying the modification function to the first PRS reference sequence. This determination may be made using RRC signaling or UE capability signaling between the base station 104 and the UE 100. If the UE 100 does not support this capability, the UE 100 may be considered a legacy device and a positive determination may be made in block 902. If the UE 100 does support this capability, a negative determination may be made in block 902.

Upon a positive determination in block 902, the logical flow may proceed to block 904 where conventional PRS generation and transmission is carried out.

Otherwise, if the UE 100 supports the disclosed PRS techniques, the logical flow will proceed to block 906. In block 906, the first PRS signal is generated. Next, in block 908, the second PRS signal is generated. In block 810, the PRS iteration is transmitted. Following block 810, the logical flow may return to block 906 to generate and transmit the next PRS iteration.

In another embodiment, the base station 104 may be configured to only support the legacy approach or the approach disclosed herein. If the base station 104 does not support the legacy approach, the base station 104 will proceed without carrying out blocks 900 and 902, and start in block 906.

With additional reference to FIG. 10, shown is an exemplary flow diagram representing steps that may be carried out by the UE 100 when executing logical instructions in accordance with the disclosed techniques. The illustrated steps are part of an operation to conduct observed time difference of arrival (OTDOA) position determination. Complimentary operations of the base station 104 also will be understood from this disclosure. Although illustrated in a logical progression, the illustrated blocks of FIG. 10 may be carried out in other orders and/or with concurrence between two or more blocks. Therefore, the illustrated flow diagram may be altered (including omitting steps) and/or may be implemented in an object-oriented manner or in a state-oriented manner.

The logical flow may start in block 1000 where the UE 100 receives the PRS sequences from the base station 104. Next, in block 1002, the UE 100 generates the first and second reference sequences. The received PRS sequences and the generated PRS reference sequences are cross correlated in block 1004. Then, a result of the cross correlation may be used to determine an estimated time difference of arrival in block 1006.

CONCLUSION

According to an aspect of the disclosure, referred to as aspect A, a method of transmitting a position reference signal (PRS) to support observed time difference of arrival (OTDOA) position determination in an electronic device (100), the method carried out by a network node (104) that has a unique identifier, includes:

a) generating (906) a first PRS sequence;

b) generating (908) a second PRS sequence by modifying the first PRS sequence with a modification function to generate the second PRS sequence, wherein a sum of the first PRS sequence and the second PRS sequence is zero; and c) transmitting (910) the first and second PRS sequences.

According to an embodiment of aspect A, referred to as aspect B, the first and second PRS sequences are transmitted in respective resource elements of a physical resource block.

According to an embodiment of any of aspects A to B, referred to as aspect C, the first and second PRS sequences are modulated for transmission in an orthogonal frequency divisional multiplexing (OFDM) symbol.

According to an embodiment of aspect C, referred to as aspect D, a constellation point representing the first PRS sequence in a constellation diagram of the OFDM symbol is opposite a constellation point representing the second PRS sequence in the constellation diagram.

According to an embodiment of any of aspects A to D, referred to as aspect E, the method further including determining (902) that the electronic device supports generating a first PRS reference sequence and generating a second PRS reference sequence by applying the modification function to the first PRS reference sequence.

According to an embodiment of aspect E, referred to as aspect F, the determining is carried out using at least one of radio resource control signaling or user equipment capability signaling between the network node and the electronic device.

According to an embodiment of any of aspects A to F, referred to as aspect G, the method further includes repeating a) through c) to provide a series of first and second PRS sequences for the electronic device.

According to another aspect of the disclosure, referred to as aspect H, a radio access node (104) in a radio access network (102) that has a unique identifier, includes:

a wireless interface (202) configured to conduct communication with an electronic device (100); and a control circuit (200) configured to:

a) generate (906) a first position reference signal (PRS) sequence;

b) generate (908) a second PRS sequence by modifying the first PRS sequence with a modification function to generate the second PRS sequence, wherein a sum of the first PRS sequence and the second PRS sequence is zero; and c) transmit (910) the first and second PRS sequences.

According to an embodiment of aspect H, referred to as aspect I, the first and second PRS sequences are transmitted in respective resource elements of a physical resource block.

According to an embodiment of any of aspects H to I, referred to as aspect J, the first and second PRS sequences are modulated for transmission in an orthogonal frequency divisional multiplexing (OFDM) symbol.

According to an embodiment of aspect J, referred to as aspect K, a constellation point representing the first PRS sequence in a constellation diagram of the OFDM symbol is opposite a constellation point representing the second PRS sequence in the constellation diagram.

According to an embodiment of any of aspects H to K, referred to as aspect L, the control circuit is further configured to determine (902) that the electronic device supports generating a first PRS reference sequence and generating a second PRS reference sequence by applying the modification function to the first PRS reference sequence.

According to an embodiment of aspect L, referred to as aspect M, the determining is carried out using at least one of radio resource control signaling or user equipment capability signaling between the radio access node and the electronic device.

According to an embodiment of any of aspects H to M, referred to as aspect N, wherein the control circuit is configured to repeat a) through c) to provide a series of first and second PRS sequences for the electronic device.

According to another aspect of the disclosure, referred to as aspect O, a method of conducting observed time difference of arrival (OTDOA) position determination by an electronic device (100), includes:

receiving (1000), from a network node with a unique identifier, a first PRS sequence and a second PRS sequence, the second PRS sequence being a modified version of the first PRS sequence by application of a modification function to the first PRS sequence and wherein a sum of the first PRS sequence and the second PRS sequence is zero;

generating (1002) a first PRS reference sequence and generating a second PRS reference sequence by applying the modification function to the first PRS reference sequence;

cross correlating (1004) the generated PRS reference sequences and the received PRS sequences; and determining (1006) an estimated time difference of arrival from a result of the cross correlating.

According to an embodiment of aspect O, referred to as aspect P, the first and second PRS sequences are modulated for transmission by the network node in an orthogonal frequency divisional multiplexing (OFDM) symbol.

According to an embodiment of aspect P, referred to as aspect Q, a constellation point representing the first PRS sequence in a constellation diagram of the OFDM symbol is opposite a constellation point representing the second PRS sequence in the constellation diagram.

According to another aspect of the disclosure, referred to as aspect R, an electronic device (100) that conducts observed time difference of arrival (OTDOA) position determination, includes:

a wireless interface (302) configured to receive (1000) a first PRS sequence and a second PRS sequence from a network node (104) with a unique identifier, the second PRS sequence being a modified version of the first PRS sequence by application of a modification function to the first PRS sequence and wherein a sum of the first PRS sequence and the second PRS sequence is zero; and a control circuit (300) configured to:

generate (1002) a first PRS reference sequence and generate a second PRS reference sequence by applying the modification function to the first PRS reference sequence;

cross correlate (1004) the generated PRS reference sequences and the received PRS sequences; and determine (1006) an estimated time difference of arrival from a result of the cross correlating.

According to an embodiment of aspect R, referred to as aspect S, the first and second PRS sequences are modulated for transmission by the network node in an orthogonal frequency divisional multiplexing (OFDM) symbol.

According to an embodiment of aspect S, referred to as aspect T, a constellation point representing the first PRS sequence in a constellation diagram of the OFDM symbol is opposite a constellation point representing the second PRS sequence in the constellation diagram.

Although certain embodiments have been shown and described, it is understood that equivalents and modifications falling within the scope of the appended claims will occur to others who are skilled in the art upon the reading and understanding of this specification.

What is claimed is:

1. A method of transmitting a position reference signal (PRS) to support observed time difference of arrival (OTDOA) position determination in an electronic device, the method carried out by a network node that has a unique identifier and comprising:
   a) generating a first PRS sequence;
   b) generating a second PRS sequence by modifying the first PRS sequence with a modification function to generate the second PRS sequence, wherein a sum of the first PRS sequence and the second PRS sequence is zero; and
   c) transmitting the first and second PRS sequences in a modulated symbol comprising the first and second PRS sequences and the unique identifier of the network node.

2. The method of claim 1, wherein the first and second PRS sequences are transmitted in respective resource elements of a physical resource block.

3. The method of claim 1, wherein the first and second PRS sequences are modulated for transmission in an orthogonal frequency divisional multiplexing (OFDM) symbol, wherein the OFDM symbol comprises a first constellation point representing the first PRS sequence and a second constellation point representing the second PRS sequence, the first and the second constellation points rotated 180 degrees from one another and forming a constellation diagram.

4. The method of claim 3, wherein the constellation point representing the first PRS sequence in the constellation diagram of the OFDM symbol is opposite the constellation point representing the second PRS sequence in the constellation diagram.

5. The method of claim 1, wherein the network node performs steps b) and c) only upon determining that the electronic device supports generating a first PRS reference sequence and generating a second PRS reference sequence by applying the modification function to the first PRS reference sequence.

6. The method of claim 5, wherein the determining is carried out using at least one of radio resource control signaling or user equipment capability signaling between the network node and the electronic device.

7. The method of claim 1, further comprising repeating a) through c) to provide a series of first and second PRS sequences for the electronic device.

8. A radio access node in a radio access network that has a unique identifier, comprising:
   a wireless interface configured to conduct communication with an electronic device; and
   a control circuit configured to:
   a) generate a first position reference signal (PRS) sequence;
   b) generate a second PRS sequence by modifying the first PRS sequence with a modification function to generate the second PRS sequence, wherein a sum of the first PRS sequence and the second PRS sequence is zero; and
   c) transmit the first and second PRS sequences in a modulated symbol comprising the first and second PRS sequences and the unique identifier of the network node.

9. The radio access node of claim 8, wherein the first and second PRS sequences are transmitted in respective resource elements of a physical resource block.

10. The radio access node of claim 8, wherein the first and second PRS sequences are modulated for transmission in an orthogonal frequency divisional multiplexing (OFDM) symbol, wherein the OFDM symbol comprises a first constellation point representing the first PRS sequence and a second constellation point representing the second PRS sequence, the first and the second constellation points rotated 180 degrees from one another and forming a constellation diagram.

11. The radio access node of claim 10, wherein the constellation point representing the first PRS sequence in the constellation diagram of the OFDM symbol is opposite the constellation point representing the second PRS sequence in the constellation diagram.

12. The radio access node of claim 8, wherein the control circuit is further configured to perform steps b) and c) only upon making a determination that the electronic device supports generating a first PRS reference sequence and generating a second PRS reference sequence by applying the modification function to the first PRS reference sequence.

13. The radio access node of claim 12, wherein the determining is carried out using at least one of radio resource control signaling or user equipment capability signaling between the radio access node and the electronic device.

14. The radio access node of claim 8, wherein the control circuit is configured to repeat a) through c) to provide a series of first and second PRS sequences for the electronic device.

15. A method of conducting observed time difference of arrival (OTDOA) position determination by an electronic device, comprising:
   receiving, from a network node with a unique identifier, a first PRS sequence and a second PRS sequence, the second PRS sequence being a modified version of the first PRS sequence by application of a modification function to the first PRS sequence and wherein a sum of the first PRS sequence and the second PRS sequence is zero;
   generating a first PRS reference sequence and generating a second PRS reference sequence by applying the modification function implemented by the network node to the first PRS reference sequence;
   cross correlating the generated PRS reference sequences and the received PRS sequences; and
   determining an estimated time difference of arrival from a result of the cross correlating.

16. The method of claim 15, wherein the first and second PRS sequences are modulated for transmission by the network node in an orthogonal frequency divisional multiplexing (OFDM) symbol, wherein the OFDM symbol comprises a first constellation point representing the first PRS sequence and a second constellation point representing the second PRS sequence, the first and the second constellation points rotated 180 degrees from one another and forming a constellation diagram.

17. The method of claim 16, wherein the constellation point representing the first PRS sequence in the constellation diagram of the OFDM symbol is opposite the constellation point representing the second PRS sequence in the constellation diagram.

18. An electronic device that conducts observed time difference of arrival (OTDOA) position determination, comprising:
- a wireless interface configured to receive a first PRS sequence and a second PRS sequence from a network node with a unique identifier, the second PRS sequence being a modified version of the first PRS sequence by application of a modification function to the first PRS sequence and wherein a sum of the first PRS sequence and the second PRS sequence is zero; and
- a control circuit configured to:
- generate a first PRS reference sequence and generate a second PRS reference sequence by applying the modification function implemented by the network node to the first PRS reference sequence;
- cross correlate the generated PRS reference sequences and the received PRS sequences; and
- determine an estimated time difference of arrival from a result of the cross correlating..

19. The electronic device of claim 18, wherein the first and second PRS sequences are modulated for transmission by the network node in an orthogonal frequency divisional multiplexing (OFDM) symbol, wherein the OFDM symbol comprises a first constellation point representing the first PRS sequence and a second constellation point representing the second PRS sequence, the first and the second constellation points rotated 180 degrees from one another and forming a constellation diagram.

20. The electronic device of claim 19, wherein the constellation point representing the first PRS sequence in the constellation diagram of the OFDM symbol is opposite the constellation point representing the second PRS sequence in the constellation diagram.

* * * * *